CHARLES BROWN.

Improvement in Baling Short Cut Straw or Hay.

No. 125,786.    Patented April 16, 1872.

No. 125,786

UNITED STATES PATENT OFFICE.

CHARLES BROWN, OF NEW YORK, N. Y.

IMPROVEMENT IN BALING SHORT-CUT HAY OR STRAW.

Specification forming part of Letters Patent No. 125,786, dated April 16, 1872.

Specification describing an Improvement in Baling Short-Cut Hay or Straw, the invention of CHARLES BROWN, of the city, county, and State of New York.

This invention relates to the putting up of short-cut hay or straw in compact bales of convenient size, shape, and weight for handling, transportation, sale, and use as feed for horses or cattle, and for other purposes. The invention consists in putting up short-cut hay or straw in packages, each of which constitutes a hollow bale, formed by a passage arranged to extend through the bale, and the walls of which are composed of the contents of the bale, whereby a more perfect ventilation is effected, so that the hay or straw may be put up greener than when baled so as to present only an outside exposure, and whereby increased facility is afforded for handling the bale or for lifting it from place to place, especially over mud or dirt. Such hollow or ventilated bale I prefer to make of cylindrical form, for the purpose of further facilitating transportation by rolling, and whereby that loss or waste which is incidental to square-shaped bales is avoided, both in moving the bale about and in detaching it for feed, by reason of the bale presenting no sharp edges or angles up its sides, and the greater convenience with which it may be chipped off as required. The invention also consists in a hollow cylindrical bale, braced at is ends by segmental wooden strips and hoops, cords, or wires, arranged to extend across the strips and down the sides of the bale in planes parallel to the axis of the latter, whereby said hollow bale is very effectually bound without impairing its ventilation; and long hay or straw may be used for partly covering the ends of the bale to hold the contents in place and to provide for ventilating the same.

Figure 1:
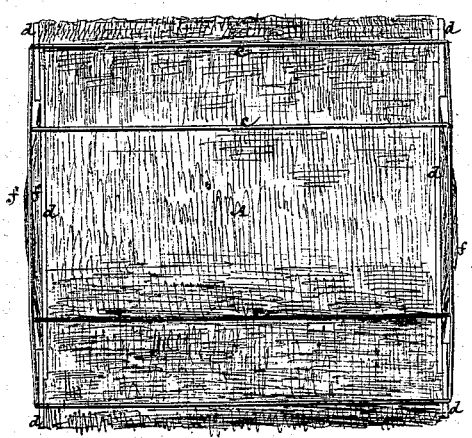
Figure 2:
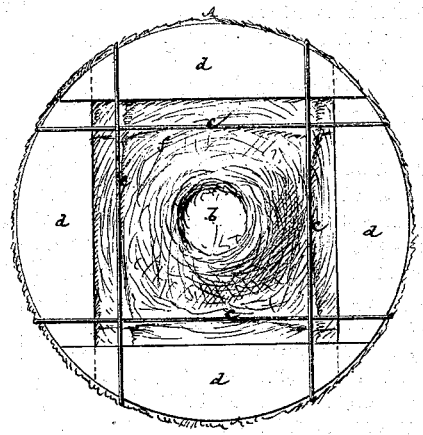
Figure 3:
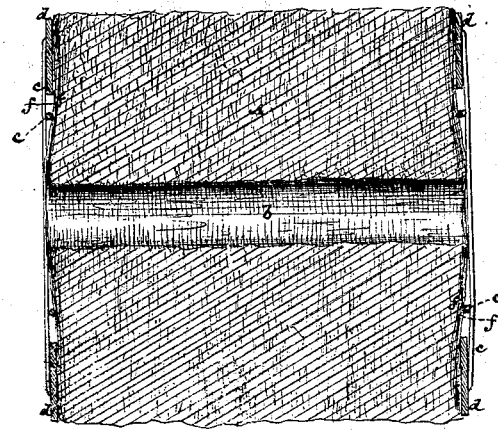

In the accompanying drawing which forms part of this specification, Figure 1 represents a longitudinal outside view of a bale of short-cut hay or straw put up in accordance with the invention; Fig. 2, an end view of the same; and Fig. 3, a longitudinal section thereof.

To press the short-cut hay or straw A into the form of a hollow cylinder, as shown, said material may be suitably piled or packed in a box of cylindrical shape, open at its ends, and resting on a grooved base for passage of the binding-hoops, cords, or wires, said base also carrying a mandrel for forming the passage $b$ in or through the bale and the follower of the press, which works within the box, being grooved like the base, also made hollow to receive the mandrel through it. The box itself should be made to open down its sides, either by hinges or otherwise, and so that when open it may be removed, whereby the bale is left wholly exposed at its sides for the convenience of hooping or binding it, the hoops, ropes, or wires $c\ c$ being passed through the grooves in the base and follower in planes parallel with the axis of the bale, and over segmental wooden strips $d\ d$, arranged to lie one upon the other, so as to brace the ends of the bale without impairing the ventilation. Long hay or straw $f$ may also be arranged over or at the ends of the bale to act, conjointly with the strips, to hold the contents of the bale in place, and to provide for the ventilation of the bale between the strips. The passage $b$ through the bale, in addition to its ventilating purpose, may also be used, by insertion of a pole or stick through it, to carry the bale.

What is here claimed, and desired to be secured by Letters Patent, is—

1. A hollow bale of short-cut hay or straw, substantially as specified.

2. The combination, with a hollow cylindrical bale, A, of the segmental-shaped binding-strips $d\ d$ at the ends of the bale, and the hoops, cords, or wires $c\ c$, arranged to cross said strips and to extend down the sides of the bale in planes at right angles to the axis of the latter, essentially as described.

CHARLES BROWN.

Witnesses:
HENRY T. BROWN,
FRED. HAYNES.